(12) United States Patent　　(10) Patent No.: US 9,420,132 B2
Wells, II　　(45) Date of Patent: Aug. 16, 2016

(54) SCANNER OPTION ASSEMBLY FOR AN IMAGE FORMING DEVICE

(71) Applicant: Lexmark International, Inc., Lexington, KY (US)

(72) Inventor: Warner Lee Wells, II, Versailles, KY (US)

(73) Assignee: LEXMARK INTERNATIONAL, INC., Lexington, KY (US)

(*) Notice: Subject to any disclaimer, the term of this patent is extended or adjusted under 35 U.S.C. 154(b) by 0 days.

(21) Appl. No.: 14/456,277

(22) Filed: Aug. 11, 2014

(65) Prior Publication Data

US 2016/0044193 A1　　Feb. 11, 2016

(51) Int. Cl.
*H04N 1/04*　　(2006.01)
*H04N 1/00*　　(2006.01)

(52) U.S. Cl.
CPC ....... *H04N 1/00546* (2013.01); *H04N 1/00557* (2013.01); *H04N 1/00588* (2013.01); *H04N 1/00904* (2013.01)

(58) Field of Classification Search
CPC .......... H04N 1/00546; H04N 1/00588; H04N 1/00904; H04N 1/00557
USPC .................................. 358/498, 497, 496, 474
See application file for complete search history.

(56) References Cited

U.S. PATENT DOCUMENTS

| | | | | |
|---|---|---|---|---|
| 5,166,812 A | * | 11/1992 | Dow | H04N 1/00541 271/288 |
| 5,956,160 A | | 9/1999 | Watanabe | |
| 6,160,642 A | * | 12/2000 | Mui | H04N 1/00525 358/496 |
| 2015/0022835 A1 | * | 1/2015 | Mori | G06K 15/16 358/1.12 |

* cited by examiner

*Primary Examiner* — Houshang Safaipour
(74) *Attorney, Agent, or Firm* — John Victor Pezdek

(57) ABSTRACT

A scanner option assembly for an image forming device. The scanner option assembly comprises a housing removably attachable to a bottom of the image forming device, and a scanner assembly mounted in the housing and being positionable to receive an original for scanning. When the housing is attached to the bottom of the image forming device, the scanner assembly receives power from the image forming device with the scanner assembly being in operable communication with a controller of the image forming device for receiving instructions from and providing scan data of an image of the original to the controller. The scanner assembly includes at least one of a flatbed scanner slidably extendible and retractable through an opening of the housing, and an automatic document feeder (ADF) assembly for automatically feeding one or more media sheets into an image capture area of the scanner assembly.

31 Claims, 10 Drawing Sheets

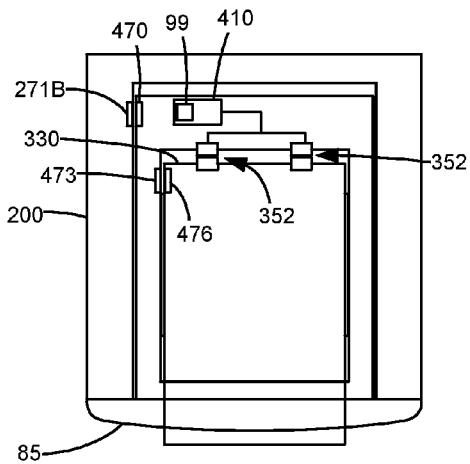# 
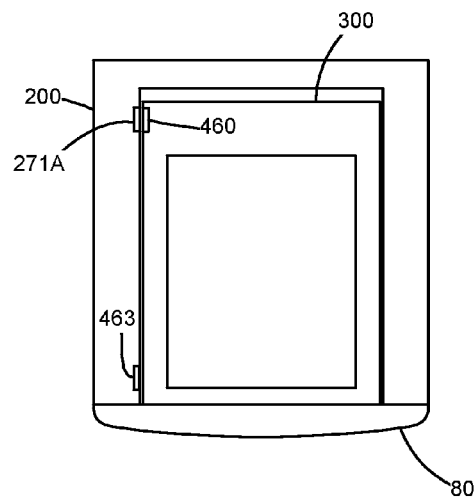
Figure 11A
Figure 12A
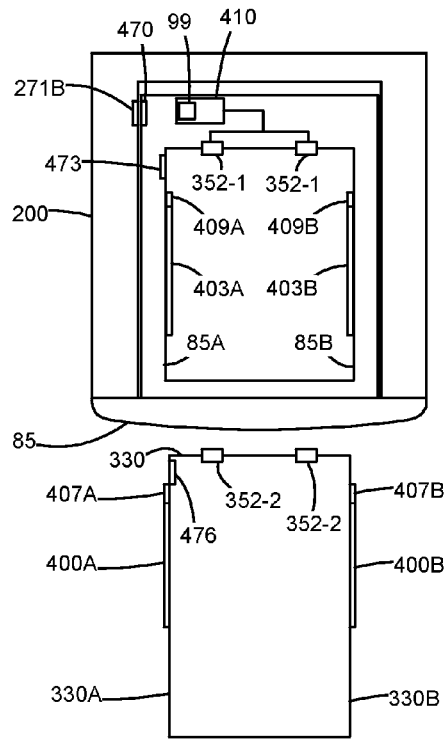
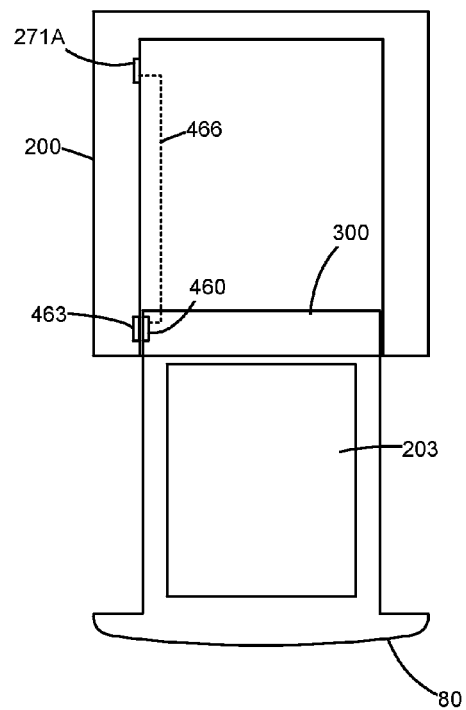
Figure 11B
Figure 12B

SCANNER OPTION ASSEMBLY FOR AN IMAGE FORMING DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The field relates generally to an option assembly removably attachable to an image forming device ("IFD"), and, in particular, to a scanner option assembly including a flatbed scanner and an automatic document feeder removably attachable to a bottom of the IFD.

2. Description of the Related Art

Multifunction devices (MFDs), also commonly referred to as all-in-one (AIO) devices, provide printing, copying, scanning, facsimile, and/or other functionalities in a single unit. Conventionally, structures of AIO devices that incorporate scanners have been designed to include scanner superstructures on top of the printers because of the open space that is required to allow for opening and closing of scan window cover assemblies. FIG. 1 shows an example conventional AIO device 1 having a lower portion comprising a printer 3 and an upper portion comprising a scanner 5. The scanner 5 has a scan window cover 7 for selectively covering a scan window of a flatbed scanner portion 9. Additionally, in the example shown, the scan window cover 7 includes an automatic document feeder (ADF) 11 to allow automatic feeding of documents. For manual scanning, the scan window cover 7 is lifted or rotated along one edge away from the scan window so that a user can place an original on the scan window. When using automatic feed mode, the scan window cover 7 is held in its closed position relative to the scan window. One or more originals placed on a feeder input area 13 are then moved through an image capture region within ADF 11 and, thereafter, to a feeder output area 15. Scan window cover may also contain an additional scanner which when used in conjunction with flatbed scanner portion 9 allows for duplex scanning of a document sheet.

While the conventional scanner superstructure has served AIO devices well, such structure introduces disadvantages of its own. For example, when the AIO device 1 is placed on a counter or a high table top, the added height makes it difficult for some users not only to access a user interface 17 disposed above the printer 3 (e.g., on the scanner superstructure) but more so the scanner 5 which is at an even greater height than the user interface 17. A caved exit bin 19 is also formed by mounting the scanner superstructure on top of the printer 3, which results to less room for users to access printed media disposed on the exit bin 19. Additionally, the number of option trays/units that can be added to the printer 3 is limited to a certain extent since adding more option units pushes the scanner 5 and user interface 17 even higher. Furthermore, it also becomes more challenging to integrate finishing options such as mailboxes, hole punch units and stapler units, around the exit bin 19 of the printer 3 due to the scanner superstructure being located on top of the AIO device 1.

Accordingly, there is a need for a scanner assembly for an AIO device that avoids the aforementioned drawbacks of scanner superstructures.

SUMMARY OF THE INVENTION

Disclosed is a scanner option assembly for an image forming device. The scanner option assembly comprises a housing removably attachable to a bottom of the image forming device, and a scanner assembly mounted in the housing and being positionable to receive an original for scanning. When the housing is attached to the bottom of the image forming device, the scanner assembly receives power from the image forming device with the scanner assembly being in operable communication with a controller of the image forming device for receiving instructions from and providing scan data of an image of the original to the controller. At least a portion of the scanner assembly is slidably extendible through an opening of the housing. In an example embodiment, the scanner assembly includes at least one of a flatbed scanner slidably extendible and retractable through the opening, and an automatic document feeder (ADF) assembly for automatically feeding one or more media sheets into an image capture area of the scanner assembly. The flatbed scanner and the ADF assembly may each be independently slidably insertable through the opening. The ADF assembly may include a media guide member that is detachably connected to the ADF assembly to provide a means for clearing media jams within the ADF assembly.

In another example embodiment, the scanner option assembly includes a media feed through channel extending between a top and a bottom of the housing for allowing a media sheet to be fed from an inferior option device attached to the bottom of the scanner option assembly to one of a superior option device and/or the image forming device attached thereto. The option assembly may further comprise a jam door connected to the housing adjacent the media feed through channel, wherein the jam door is movable between an open position and a closed position relative to the media feed through channel. When the jam door is in the open position, the media feed through channel is accessible.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

FIGS. 11A-11B are top schematic views of the ADF scanner tray with the front ADF path assembly attached to and detached from the ADF scanner tray, respectively.

FIGS. 12A-12 B are top schematic views of the flatbed scanner tray inserted within and extended out of the scanner option assembly housing, respectively.

DETAILED DESCRIPTION

Figure 1:
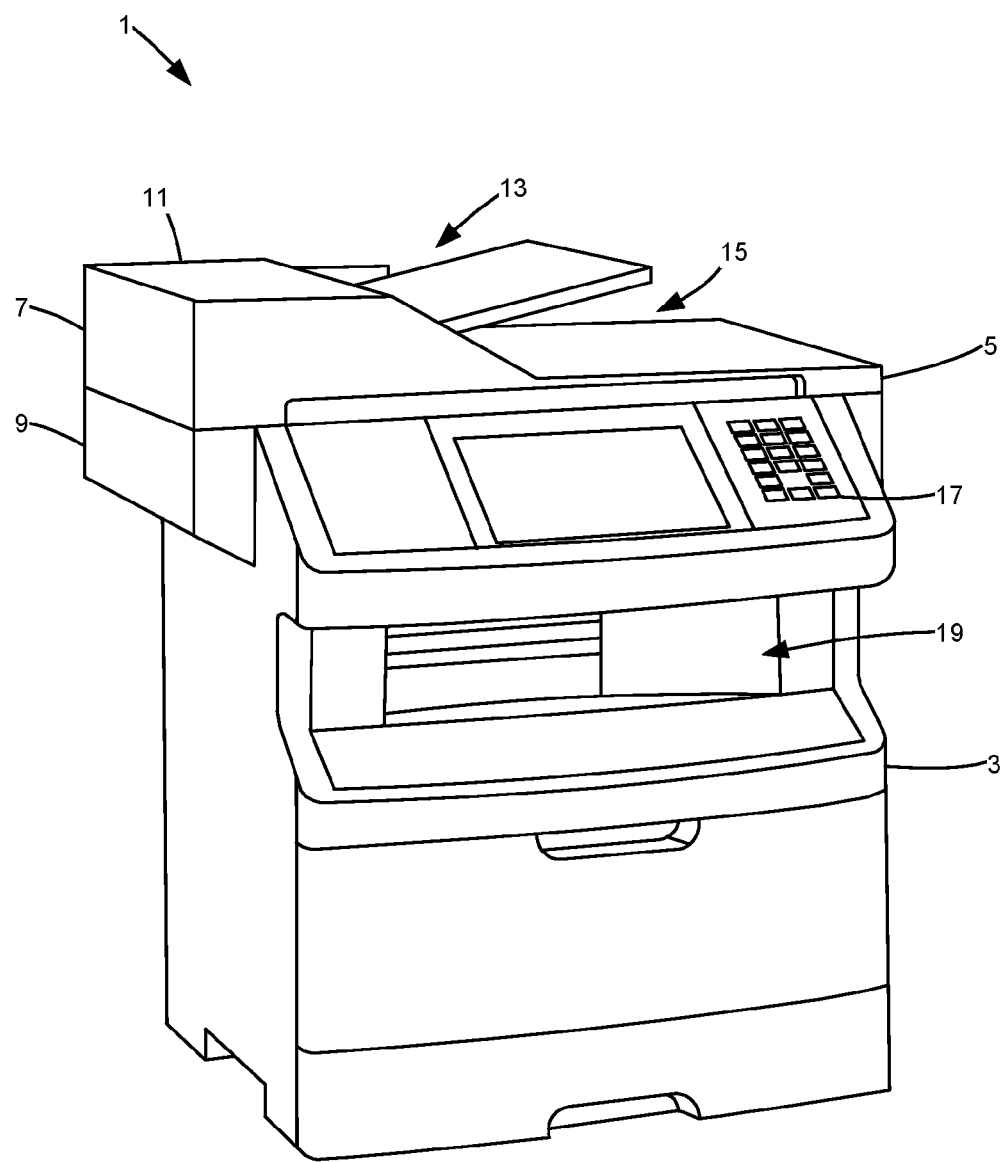
FIG. 1 illustrates a conventional AIO device having a lower portion comprising a printer and an upper portion comprising a scanner superstructure.

It is to be understood that the present application is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "attached," "connected," "coupled," and "mounted," and variations thereof herein are used broadly and encompass direct and indirect attachments, connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this Detailed Description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and other alternative mechanical configurations are possible.

As used herein, the term "communication link" is used to generally refer to structure that facilitates electronic communication between multiple components, and may operate using wired or wireless technology. While several communication links are shown, it is understood that a single communication link may serve the same functions as the multiple communication links that are illustrated. The media is said to move along the media path and the media path extensions from an upstream location to a downstream location as it moves from the media trays to the output area of the IFD. For each option tray, the top of the option tray is downstream from the bottom of the option tray. Conversely, the bottom of the option tray is upstream from the top of the option tray. Further, the media is conveyed using pairs of rollers that form nips therebetween. The term "nip" is used in the conventional sense to refer to a nip formed between two rollers that are located at about the same point in the media path and have a common point of tangency to the media path. With this nip type, the axes of the rollers are parallel to one another and are typically, but do not have to be, transverse to the media path. For example, a deskewing nip may be at an acute angle to the media feed path. The term "separated nip" refers to a nip formed between two rollers that are located at different points along the media path and have no common point of tangency with the media path. Again the axes of rotation of the rollers having a separate nip are parallel but are offset from one another along the media path. Nip gap refers to the space between two rollers. Nip gaps may be open, where there is an opening between the two rollers, zero where the two rollers are tangentially touching or negative where there is an interference between the two rollers. As used herein, the leading edge of the media is that edge which first enters the media path and the trailing edge of the media is that edge that last enters the media path. Depending on the orientation of the media in the media trays, the leading/trailing edges may be the short edge of the media or the long edge of the media, in that most media is rectangular. Further relative positional terms are used herein. For example, "superior" means that an element is above another element. Conversely "inferior" means that an element is below or beneath another element. "Media process direction" describes the movement of media within the imaging system as is generally meant to be from an input toward an output of the imaging system 1. The explanations of these terms along with the use of the terms "top," "bottom," "front," "rear," "left," "right," "up," and "down" are made to aid in understanding the spatial relationship of the various components and are not intended to be limiting.

Figure 2:
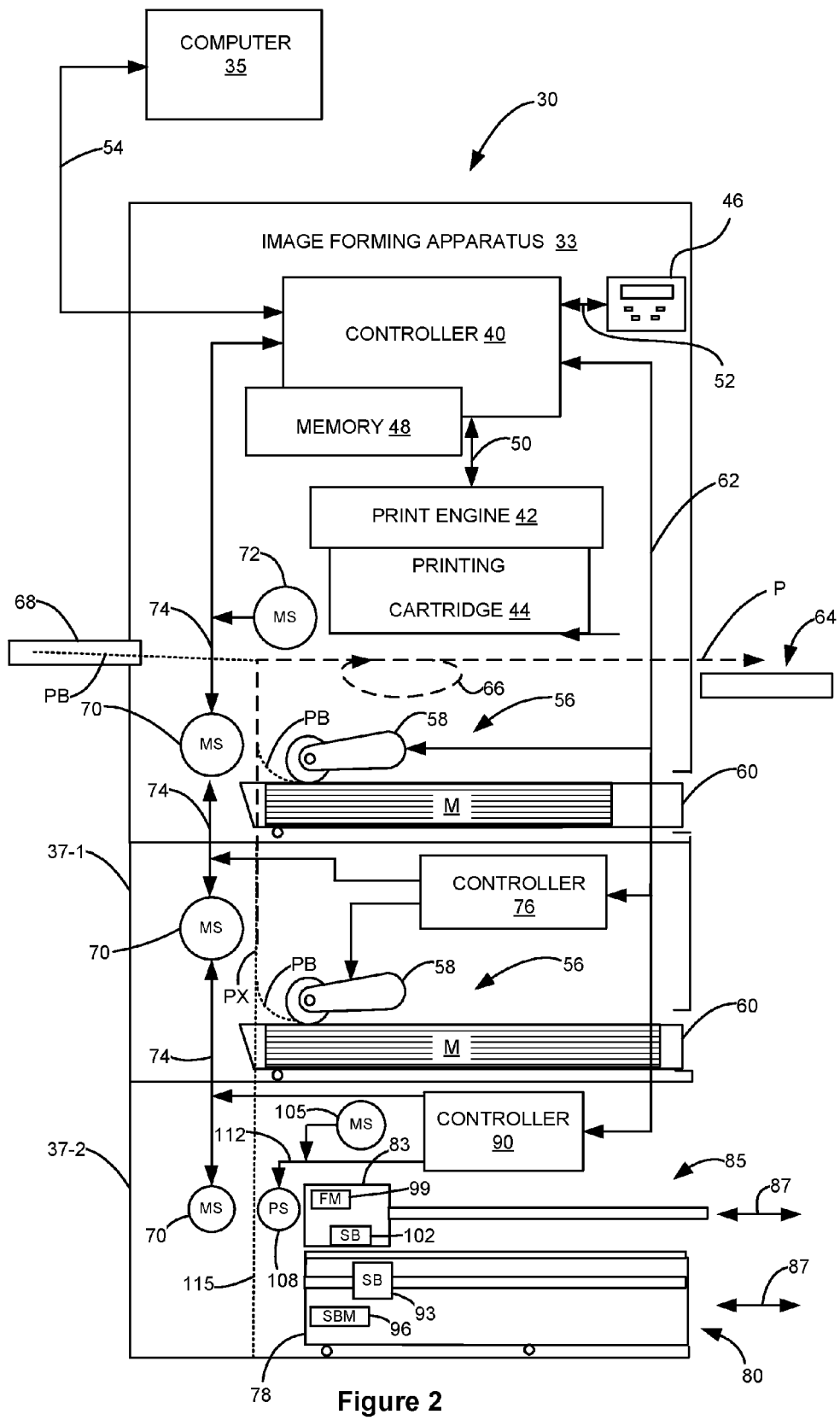
FIG. 2 is a schematic view of an imaging system according to one example embodiment.

Referring now to the drawings and particularly to FIG. 2, there is shown a diagrammatic depiction of an imaging system 30. As shown, imaging system 30 may include an IFD 33, an optional computer 35 and/or one or more option assemblies 37 attached to the IFD 33. Option assemblies 37-1, 37-2 are illustrated being mounted below IFD 33. IFD 33 is shown as a multifunction machine that includes a controller 40, a print engine 42, a printing cartridge 44, and a user interface 46. IFD 33 may communicate with computer 35 via a standard communication protocol, such as for example, universal serial bus (USB), Ethernet or IEEE 802.xx. A multifunction machine is also sometimes referred to in the art as an all-in-one (AIO) unit. Those skilled in the art will recognize that IFD 33 may be, for example, an ink jet printer/copier; an electrophotographic printer/copier; or a thermal transfer printer/copier.

Controller 40 includes a processor unit and associated memory 48, and may be formed as one or more Application Specific Integrated Circuits (ASIC). Memory 48 may be, for example, random access memory (RAM), read only memory (ROM), and/or non-volatile RAM (NVRAM). Alternatively, memory 48 may be in the form of a separate electronic memory (e.g., RAM, ROM, and/or NVRAM), a hard drive, a CD or DVD drive, or any memory device convenient for use with controller 40. In one embodiment, controller 40 communicates with print engine 42 via a communication link 50. User interface 46 is communicatively coupled to controller 40 via a communication link 52. Controller 40 serves to process print data and to operate print engine 42 during printing. Controller 40 may also be connected to computer 35 via a communication link 54 where status indications and messages regarding the media and IFD 33 and any attached option assemblies 37 may be displayed and from which operating commands may be received. Computer 35 may be located nearby IFD 33 or remotely connected to IFD 33. In some circumstances, it may be desirable to operate IFD 33 in a standalone mode. In the standalone mode, IFD 33 is capable of functioning without a computer.

IFD 33 also includes a media feed system 56 having a pick mechanism 58 and removable media input tray (RMIT) 60 for holding media M to be printed. Pick mechanism 56 is controlled by controller 40 via communication link 62. A media path P (shown in dashed line) is provided from RMIT 60 extending through the print engine 42 to a media output area 64, to a duplexing path 66 or to various finishing devices. Media path P may also have extensions PX and/or branches PB (shown in dotted line) from or to other removable media input trays as described herein such as that shown in option assembly 37-1. Media path P may include a multipurpose manual input tray 68 and corresponding path branch PB that merges with the media path P within IFD 33. Along the media path P and its extensions PX are provided media sensors 70 which are used to detect the position of the media, usually the leading and trailing edges of the media, as it moves along the media path P. Downstream of RMIT 60 in IFD 33, a media sensor 72 is positioned along the media path P to sense the presence of, as well as the leading and trailing edges of media being fed from RMIT 60 within IFD 33 as well as media being fed from or through option assembly 37-1. Media sensors 70 and 72 are shown in communication with controller 40 via communication link 74.

Option assembly 37-1 is removably attachable to a bottom of IFD 33 or a superior option assembly. In the example shown, option assembly 37-1 is shown attached to the bottom of IFD 33. Option assembly 37-1 includes a media feed system 56 having a pick mechanism 58 and a removable media input tray 60 for holding media M to be printed. A controller 76 is provided within option assembly 37-1 and operates various motors housed within option assembly 37-1 that position media for feeding, feed media from media path branches PB into media path P or media path extensions PX as well as feed media along media path extensions PX and media path P and control the travel of media along media path P and media path extensions PX. Along the media path extensions PX are provided media sensors 70 which are used to detect the position of the media as it moves along the media path extension PX. Media sensors 70 positioned along media path extension PX are shown in communication with controller 40 via communication link 74. Controller 40 also communicates with controller 76 via communication links 62 and 74.

In accordance with example embodiments of the present disclosure, imaging system 30 may include a scanner option assembly 37-2 that is removably attachable to the bottom of IFD 33 or a superior option assembly 37 attached thereto. In the example shown, scanner option assembly 37-2 is shown attached to the bottom of option assembly 37-1. Scanner option assembly 37-2 generally includes at least one image capture unit for capturing an image of at least one surface of an original. Scanner option assembly 37-2 may include a flatbed scanner 78 incorporated in a flatbed scanner tray 80 and/or an automatic document feeder (ADF) 83 incorporated in an ADF tray 85. In an example embodiment, flatbed scanner tray 80 and ADF tray 85 are each removably slidable and insertable within scanner option assembly 37-2, as indicated by arrows 87. A controller 90 may be provided within scanner option assembly 37-2 to operate a scan bar 93 and a scan bar motor 96 of flatbed scanner tray 80, a feed motor 99 and a scan bar 102 of ADF tray 85, and various media sensors 105 and position sensors 108 within scanner option assembly 37-2. Media sensors 105 may be used for determining when media is present in flatbed scanner tray 80 or ADF tray 85, the size of the media and/or the location of the leading and trailing edges of the media. Position sensors 108 may be used for determining position of flatbed scanner tray 80 and ADF tray 85 within scanner option assembly 37-2. Media sensors 105 and position sensors 108 are shown in communication with controller 90 via communication link 112. Controller 40 also communicates with controller 90 via communication links 62 and 74.

Although three controllers 40, 76, and 90 are shown, it should be realized that a single controller may be used to control IDF 33 and both option assemblies 37-1, 37-2. The number and location of the controllers should not be considered as a limitation.

Scanner option assembly 37-2 may optionally include a media feed through channel 115 extending between a top and a bottom of scanner option assembly 37-2 such that when an inferior option device is attached to the bottom of the scanner option assembly 37-2, media sheets from the inferior option device can be fed to option assembly 37-1 and to IFD 33. Controller 40 operates a motor that is used to drive one or more media feed roll pairs to move media along media feed through channel 115 and into media path extensions PX of superior option assembly 37-1 (see FIG. 8). Media sensors 70 may be provided to detect the position of the media as it moves along media feed through channel 115. Media sensors 70 are shown in communication with controller 40 via communication link 74.

Figure 3:
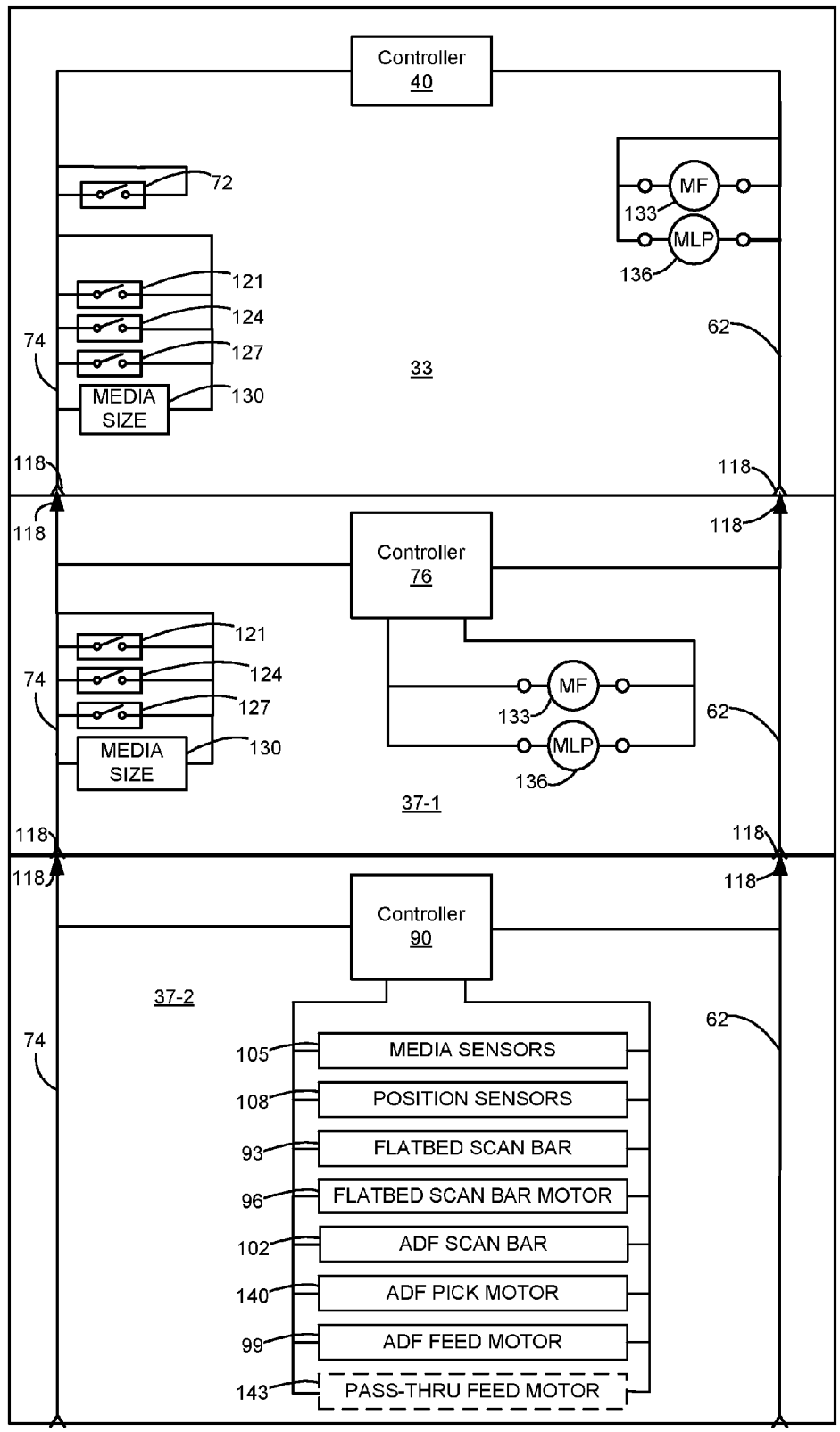
FIG. 3 is an electrical schematic of the sensors and motors used in the imaging system according to an example embodiment.

A basic schematic of the various sensors and motors used within IFD 33, option assembly 37-1, and scanner option assembly 37-2 is illustrated in FIG. 3. IFD 33 and with controller 40 is shown on top of two option assemblies 37-1 and 37-2. Communication links 62 and 74 from controller 40 are connected to each option assembly 37-1 and 37-2 via electrical connections 118. Media sensor 72 located in IFD 33 is shown connected to communication link 74, which is shown providing input signals to controller 40 while communication link 62 is shown providing output signals from controller 40. Communication links 62 and 74 may be a single communication link. Also provided in IFD 33, are a media sensor 121 for sensing media picked from RMIT 60, a media out sensor 124 for sensing whether RMIT 60 is out of media, an index sensor 127 used to determine whether upward indexing of a stack of media sheets within RMIT 60 is needed to ensure that the top of the stack of media sheets is within a desired pick height, and media size sensor 130 for sensing media sheet size. Connected to communication link 62 are a feed motor 133 used for the drive mechanism that powers feed rolls along media path P and/or media path extensions PX, and drive motor 136 used for the drive mechanism that powers pick mechanism 58.

In option assembly 37-1, connected to communication link 74, are media sensor 121 for sensing media picked from RMIT 60, media out sensor 124 and index sensor 127, and media size sensor 130, all of which provide data used by controller 40. Connected to communication link 62 is controller 76 which receives communications from controller 40 for feeding media out of RMIT 60 and along media path extensions PX. Feed motor 133 used for the drive mechanism that powers feed rolls along media path extension PX and drive motor 136 used for the drive mechanism that powers pick mechanism 58, are controlled by controller 76.

In option assembly 37-2, connected to communication link 62 is controller 90 which receives communications from controller 40 for capturing an image of at least one surface of an original. Connected to controller 90 are media sensors 105 and position sensors 108, all of which provide data used by controller 90. Controlled by controller 90 are flatbed scan bar 93, flatbed scan bar motor 96 used for the drive mechanism that translates the flatbed scan bar 93 within flatbed scanner tray 80, ADF scan bar 102, an ADF pick motor 140 used for the drive mechanism that powers an ADF pick mechanism for picking media sheets to be scanned, and/or feed motor 99 used for the drive mechanism that powers feed rolls for conveying media sheets along a media path within the ADF. In the example embodiment where media feed through channel 115 is included, controller 90 controls a pass-thru feed motor 143 used for the drive mechanism that powers feed rolls along media feed through channel 115.

Figure 4:
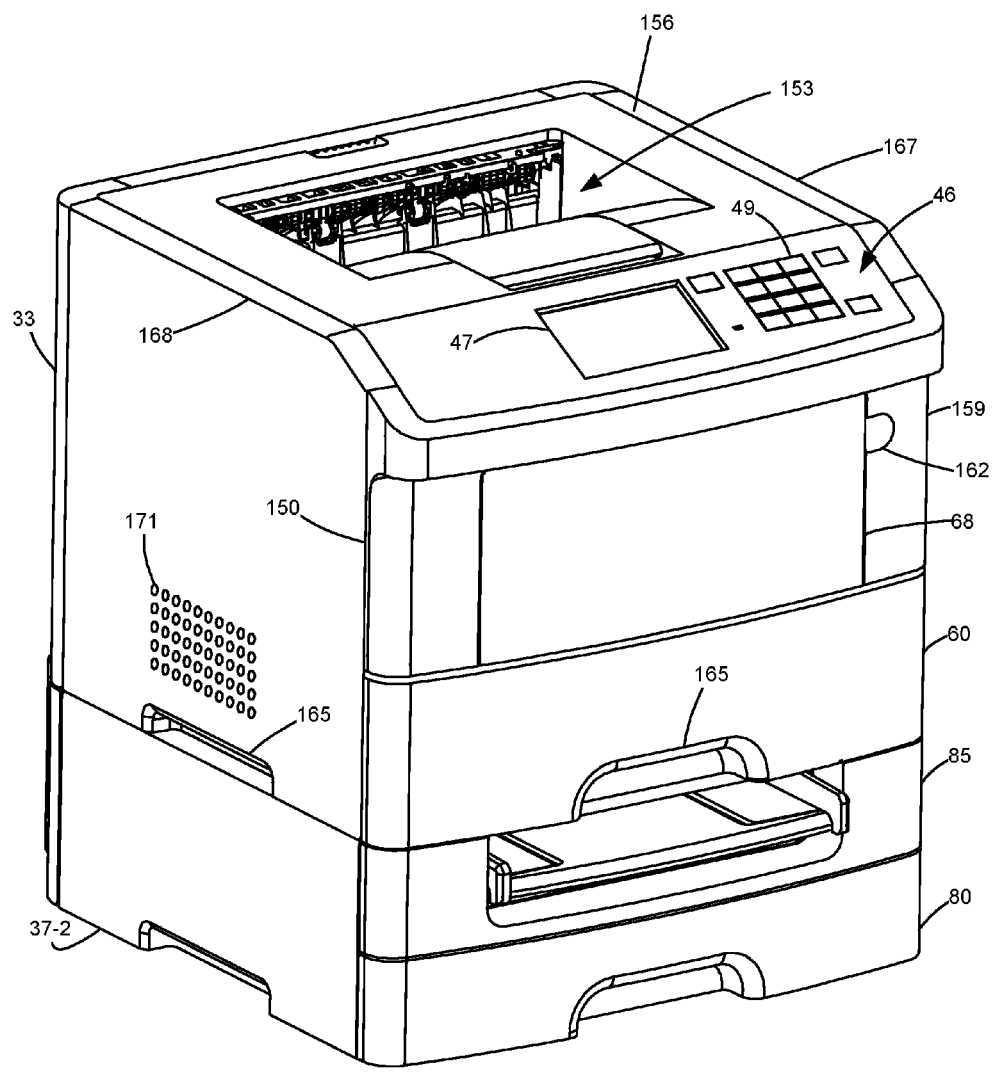
FIG. 4 is an illustration of an image forming device with an attached scanner option assembly according to an example embodiment.

FIG. 4 illustrates IFD 33 that includes the RMIT 60 that is integrated into a lower portion of a housing 150 of IFD 33, and scanner option assembly 37-2 attached to the bottom of housing 150. A media output area 153 is provided in the top 156 of housing 150. Multipurpose media input tray 68 folds out from the front 159 of housing 150 which may be used for handling envelopes, index cards or other media for which only a small number of media will be printed. A latch 162 is provided on the front 159 to secure multipurpose media input tray 68 in the closed position. Hand grips 165 are provided in several locations on housing 150, such as on sides 167, 168, and on the front of RMIT 60. Also, various ventilation openings, such as vent 171, are provided at locations on sides 167, 168 of housing 150. User interface 46 is provided in the front top portion of housing 150. User interface 46 may comprise a display 47, such as a touch screen, and a key pad 49. Display 47 and key pad 49 may be used to provide input to controller 40. For example, a user may select single sided or duplex scanning, or color or monochrome scanning Display 47 may be used to provide information about the functioning and status of IFD 33 and scanner option assembly 37-2 to a user.

IFD 33 is at the top of the stack and sits on top of scanner option assembly 37-2 having flatbed scanner tray 80 and ADF tray 85. Latches and alignment features are provided as described herein between adjacent units. An adjacent unit is either an IFD 33 or another option assembly 37. Additional option assemblies 37 may be added to the stack below scanner option assembly 37-2. As each option assembly 37 is added, an extension PX to the media path P is also added. The media path extension PX within each option assembly 37 is comprised of two branches which eventually merge at a point above their respective housings, either, depending on location within the stack, within a superior option assembly 37 or within IFD 33 itself.

Figure 5:
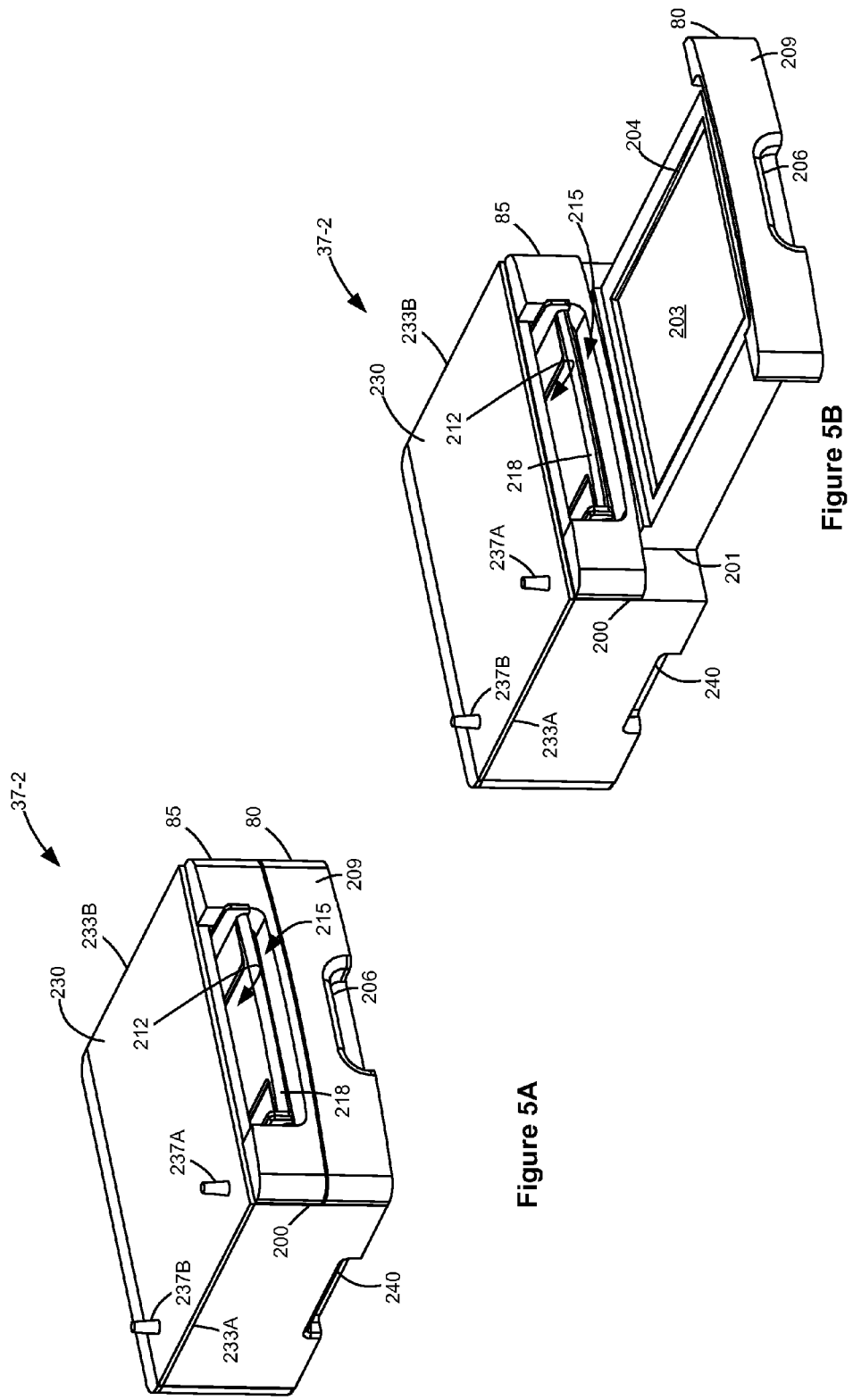
FIGS. 5A-5B are illustrations of the scanner option assembly of FIG. 4 including a flatbed scanner tray and an ADF scanner tray with FIG. 5B showing the flatbed scanner tray being extended from the scanner option assembly housing.
Figure 6:
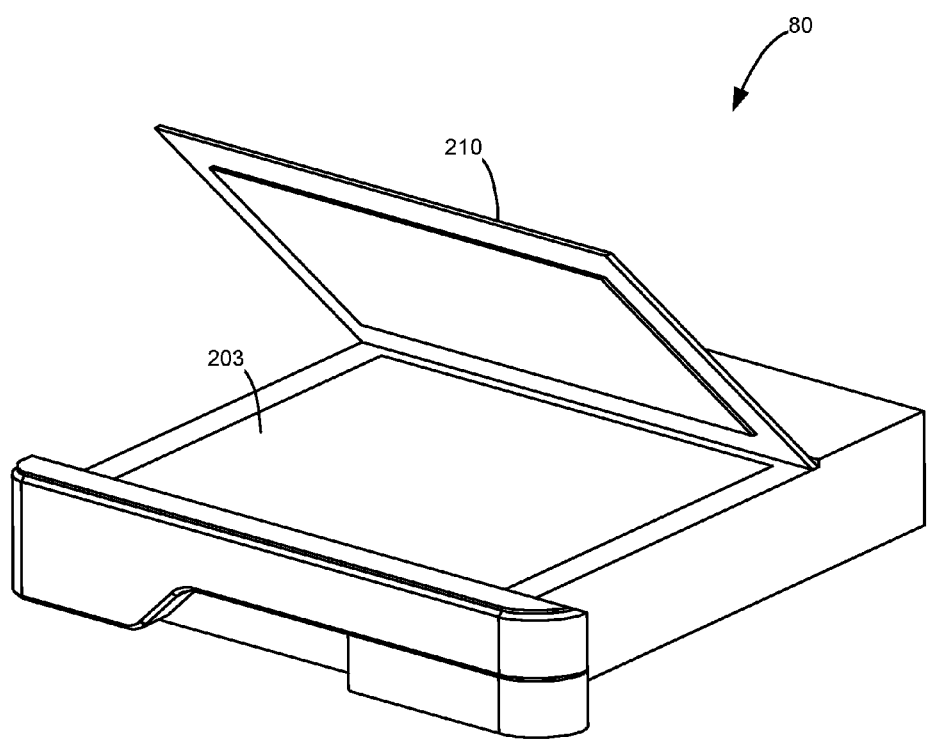
FIG. 6 is an illustration of the flatbed scanner tray including a scan lid according to an example embodiment.

FIGS. 5A-5B illustrate scanner option assembly 37-2 comprising flatbed scanner tray 80 and ADF tray 85, and a housing 200 in which flatbed scanner tray 80 and ADF tray 85 are placed. In FIG. 5B, flatbed scanner tray 80 is extended out an opening 201 of housing 200 to show a scan window 203 onto which a document to be scanned is placed. A hand grip 206 is provided in the exterior of the front 209 of flatbed scanner tray 80. Additionally or in the alternative, flatbed scanner tray 80 may include a hinged scan lid 210 pivotably attached thereto, as shown in FIG. 6, and movable between an open position where scan lid 210 is rotated away from scan window 203, and a closed position where scan lid 210 covers scan window 203. ADF tray 85 includes an input media area 212 and an output media area 215. An input media support 218 is mounted in a cantilever manner in ADF tray 85 and an upper surface thereof provides input media area 212 where media to be scanned are placed. Beneath input media support 218 is output media area 215 where scanned media are disposed after being scanned. Housing 200 generally includes a top 230 fastened to side walls 233A, 233B by fasteners such as screws (not shown), or which may be integrally formed as a single piece. Alignment posts 237A, 237B extend vertically from housing 200 and through top 230 and are received by corresponding alignment holes (not shown) in the unit above it, which is either IFD 33 or a superior option assembly 37, to maintain proper alignment therebetween. Hand grips 240 are provided in the exterior portion of side walls 233A, 233B.

Figure 7:
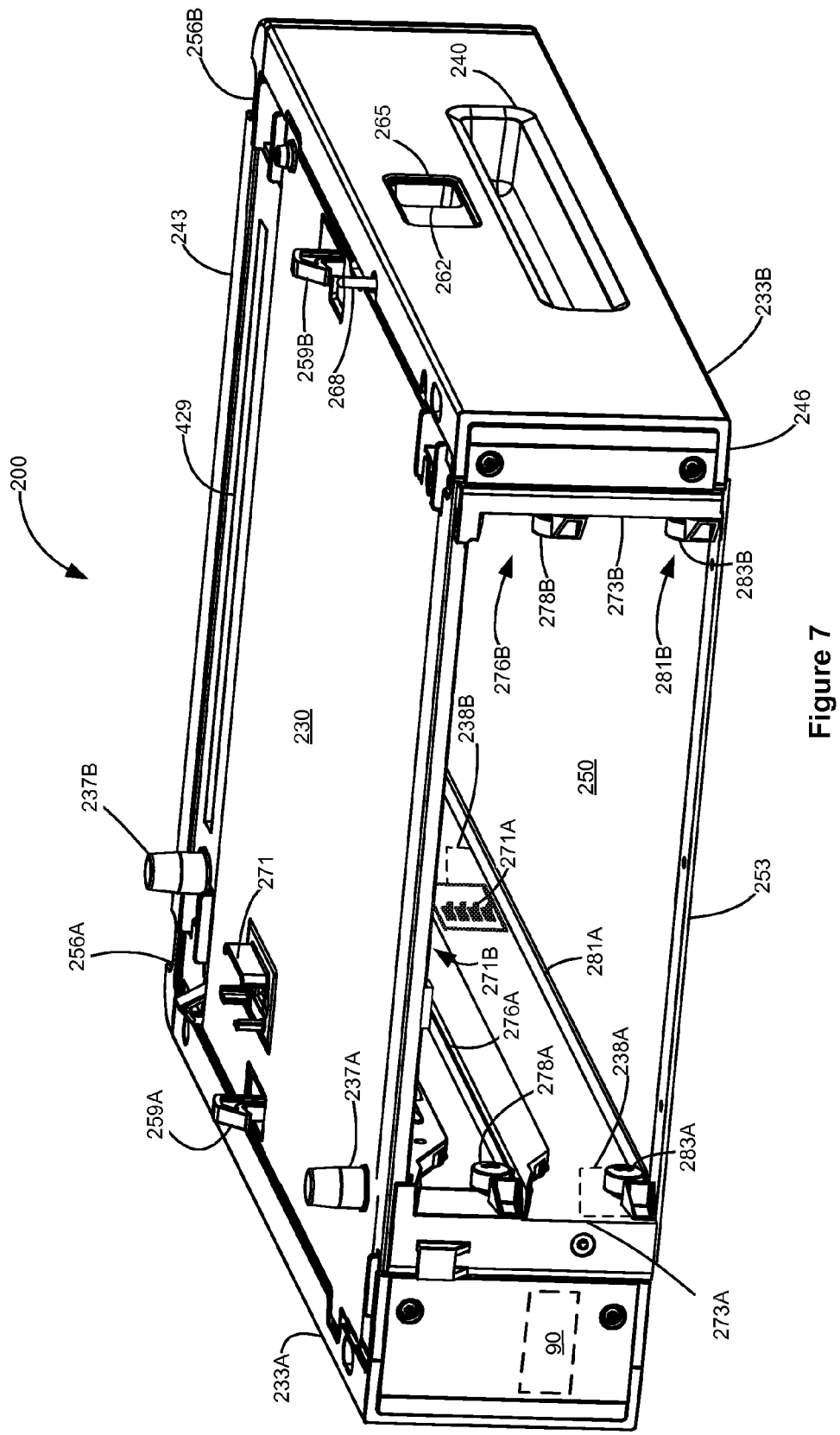
FIG. 7 is an illustration of a housing for the scanner option assembly according to an example embodiment.

Referring to FIG. 7, housing 200 of scanner option assembly 37-2 is shown in further detail according to an example embodiment. As shown, housing 200 comprises top 230, generally parallel sides 233A, 233B, and a rear wall 243. As illustrated, alignment posts 237A, 237B extend vertically from the top of side wall 233A and are aligned with one another so that a line drawn between them would be parallel with side 233A. As illustrated, alignment posts 237A, 237B extend upwardly from top 230, such as by about 25 mm. Front alignment post 237A fastens to the top of side wall 233A. Rear alignment post 237B is molded as part of side wall 233A. Front and rear alignment holes 238A, 238B (shown in dashed line) are molded into and extend vertically from the bottom of side wall 233A and are aligned with alignment posts 237A, 237B. Because front and rear alignment holes 238A, 238B are molded into side wall 233A, their positions can be accurately determined and controlled with a minimum of tolerance stackup from unit to unit lowering vertical misalignment between media path extension PX and media feed through channel 115. Front and rear alignment posts 237A, 237B are received into corresponding front and rear alignment holes in the unit which is above it, either another option assembly 37 or IFD 33. The upper ends of alignment posts 237A, 237B are tapered to provide for easier insertion. The bottom 246 of housing 200 may have an opening 250 generally defined by sides 233A, 233B and rear wall 243. A support 253 extends between the lower proximal ends of side walls 233A, 233B to maintain the parallelism between side walls 233A, 233B and define a front edge of opening 250. Rear wall 243 is provided with a pair of vertical channels 256A, 256B, each located near sidewalls 233A, 233B, respectively. Channels 256A, 256B serve as wire ways for cabling.

Spring biased hooks 259A, 259B extend vertically from the top of side walls 233A, 233B, respectively, and serve as latches to secure scanner option assembly 37-2 to the unit above. Corresponding latch holes are provided in the bottom of side walls 233A, 233B. As an upper unit, e.g., IFD 33 or another option assembly 37 is lowered onto top 230 of housing 200, spring-biased hooks 259A, 259B automatically engage with corresponding latch holes in the unit being installed locking the unit into position on top of housing 200. A spring biased release actuator 262 is provided in recess 265 on one or both of side walls 233A, 233B. As shown, release actuator 262 is in side wall 233B. Adjacent hook 259B is a spring-biased rod 268 vertically mounted within side wall 233B. When an upper unit is mounted on top of housing 200 and is properly situated, rod 268 will be depressed into side wall 233B and hooks 259A, 259B will be engaged with the upper unit. To remove an installed upper unit, a user pulls or slides release actuator 262 against its bias spring toward the front of housing 200 which rotates hooks 259A, 259B toward rear wall 243 lowering hooks 259A, 259B and disengaging hooks 259A, 259B from the upper unit. At the same time, an end of rod 268 within side wall 233B engages a detent or recess in release actuator 262 and retains release actuator 262 keeping hooks 259A, 259B in a lower unengaged position allowing the upper unit to be lifted off by a single user. As the upper unit is lifted, rod 268 rises due to the spring biasing and releases actuator 262 which springs back to its starting position. In turn hooks 259A and 259B spring back to a vertical position ready to be reengaged when an upper unit is again placed on housing 200. A second rod, a second recess and a second actuator similar to rod 268, recess 265 and actuator 262, may be provided in side wall 233A.

In side wall 233A, on both its top and bottom is an electrical connector 271 that will allow for passing power from IFD 33 to scanner option assembly 37-2, and particularly to each of flatbed scanner tray 80 and ADF tray 85 via electrical connectors 271A and 271B, respectively, which are connected to electrical connector 271, and/or for communication links 62 and 74 to be extended into and through scanner option assembly 37-2 and place controller 40 in operable communication with controller 90 when scanner option assembly 37-2 is attached to IFD 33. As shown, a male electrical connection is shown on the top of side wall 233A. A female electrical connection (not shown) is provided on the bottom of side wall 233A and in the bottom of housing 200 to provide power and communication to an inferior option assembly. Controller 90 is housed in or on side wall 233A and is in communication with controller 40 in IFD 33 via communication links 62, 74 and the various sensors within scanner option assembly 37-2. On interior portions 273A, 273B of side walls 233A, 233B, guide tracks 276A, 276B and guide rollers 278A, 278B, respectively, are provided and cooperatively engage ADF tray 85 to provide support and assist with insertion and removal thereof from housing 200. Similarly, guide tracks 281A, 281B and guide rollers 283A, 283B, respectively, are provided on interior portions 273A, 273B to cooperatively engage with flatbed scanner tray 80 to provide support and assist with insertion and removal thereof from housing 200.

Figure 8:
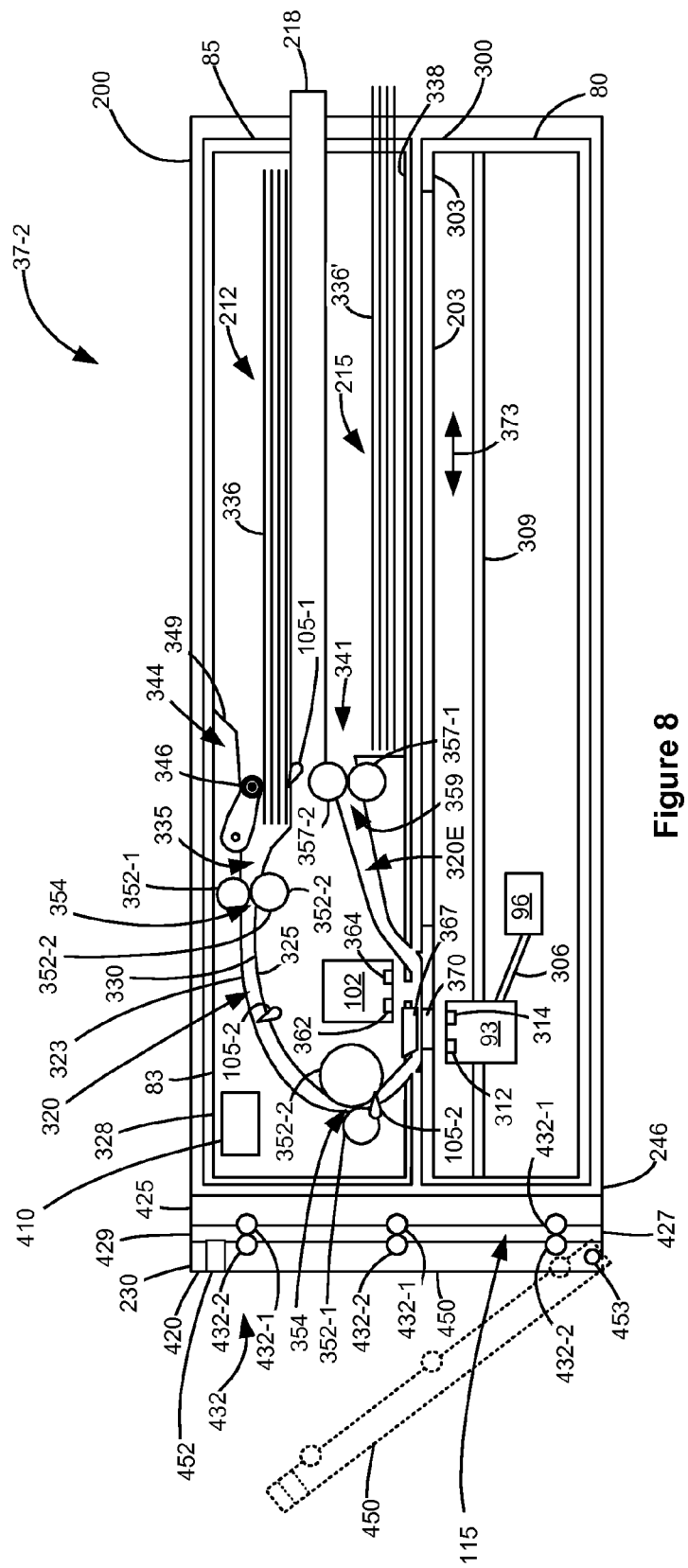
FIG. 8 is a schematic illustration of the scanner option assembly including the flatbed scanner tray and the ADF scanner tray, according to an example embodiment.

Shown in FIG. 8 is a schematic illustration of scanner option assembly 37-2 including flatbed scanner tray 80 and ADF tray 85, according to an example embodiment. As shown, flatbed scanner tray 80 includes a base 300 and scan window 203 incorporated into an upper surface 303 thereof. Scan window 203 is transparent and holds an original having an image to be scanned. Within base 300 are flatbed scan bar 93, a drive transmission 306, and flatbed scan bar motor 96. Flatbed scan bar motor 96 is operatively coupled to drive transmission 306 that in turn is used to translate flatbed scan bar 93 beneath scan window 203 along the length of scan window 203 on a pair of spaced parallel rails 309 mounted in base 300 when scanning an original placed on scan window 203. Flatbed scan bar 93 includes a light source 312 and a photoreceptor array 314. Flatbed scan bar 93 is used to illuminate and scan a bottom surface of an original. As used herein, "bottom surface" refers to that surface of the original being scanned that is in contact with the upper surface of scan window 203.

ADF tray 85 includes input media area 212, ADF 83, output media area 215, and ADF scan bar 102. ADF 83 includes an ADF path 320 defined between a first media guide member 323 and a second media guide member 325. In an example embodiment, first media guide member 323 is formed by a rear ADF path assembly 328 and second media guide member 325 is formed by a front ADF path assembly 330. Further, in the example shown, ADF scan bar 102 is incorporated as part of front ADF path assembly 330. Media input support 218 extends from an input end 335 of ADF path 320 and provides input media area 212 where originals 336 having images to be scanned are placed. An output media support 338 extends from an output end 341 of ADF path 320 and provides output media area 215 where the scanned originals 336' are placed. A pick assembly 344 having a pick roll 346 is attached to an upper frame section 349 of ADF tray 85 for picking media sheets disposed on input media area 212. A plurality of feed roll pairs 352, each pair having opposed rolls 352-1, 352-2 forming feed nips 354 therebetween, are spaced along ADF path 320 for conveying media sheets from input media area 212 to output media area 215. Exit feed roll pair 357 having opposed rolls 357-1, 357-2 forming feed nip 359 are disposed at the output end 341 of ADF path 320 along a media exit path portion 320E of ADF path 320. Pick roll 346 and one roll or both rolls in each feed roll pair 352, 357 are driven by motors 140, 99, respectively.

As would be understood by one of ordinary skill in the art, a drive mechanism including one or more gear mechanisms and a motor is used to drive feed roll pairs 352, 357 to advance media sheets along ADF path 320. ADF tray 85 further includes a plurality of media sensors 105 positioned to detect presence of media sheets and/or media position as they advance along ADF path 320. For example, media sensor 105-1 is positioned adjacent to input end 335 of ADF path 320 to provide signals to controller 90 indicative of at least one media sheet being disposed in input media area 212. Media sensors 105-2, are positioned downstream of respective feed roll pairs 352 to detect a leading edge of the fed media sheet and provide signals to controller 90 indicative of the position of the media sheet along ADF path 320.

ADF scan bar 102 also includes a light source 362 and a photoreceptor array 364. ADF scan bar 102 is incorporated in front ADF path assembly 330 and is used to illuminate and scan a scan line on an upper surface of an original. As used herein, "upper surface" refers to that surface of the original being scanned that is facing away from scan window 203. Second media guide member 325 also incorporates a spring biased hold down bar 367 for pressing a portion of the media being scanned against an imaging surface 370, which is also a transparent window, on the upper surface 303 of base 300.

Flatbed scan bar 93 may be a contact image sensor (CIS) scan bar or an optical reduction scan bar. ADF scan bar 102 may be a CIS scan bar or an optical reduction scan bar. Flatbed scan bar 93 may be an optical reduction scan bar while ADF scan bar 102 may a CIS scan bar and vice versa. In other words the flatbed and ADF scan bars 93, 102 do not have to be of the same type.

To scan an original in manual mode, flatbed scanner tray 80 is slidably extended out of opening 201 of housing 200 to an extent that would expose scan window 203 and allow a user to place an original thereon. In one embodiment, flatbed scanner tray 80 may be fully inserted back into housing 200 after placing the original on scan window 203 prior to starting a scanning operation. In this example, a means for holding the original in place against the scan window 203 upon insertion may also be provided. For example, one or more media sheet slots 204 formed along one or more borders of the scan window 203 (see FIG. 5B) may be provided where edges of the original may be inserted in order to provide frictional force to hold the original in place against scan window 203. Alternatively, in the example embodiment where scan lid 210 is pivotably attached to base 300 of flatbed scanner tray 80 (see FIG. 6), scan lid 210 may be closed after placing the original on the scan window 203 such that there may not be a need to reinsert flatbed scanner tray 80 into housing 200. Under direction of controller 90, flatbed scan bar 93 moves in a bi-directional scan direction, indicated by arrow 373, along at least a portion of the length of scan window 203. While moving along rails 309, flatbed scan bar 93 illuminates and scans scan lines on the bottom surface of the original placed on scan window 203. As illustrated, the scan area and scan lines are directed orthogonally into the plane of the page on which FIG. 8 is shown. The scan area is sized to handle various sizes of media such as A4, Letter, Legal or Ledger sized media, or smaller.

To scan one or more originals in ADF mode, ADF tray 85 is fully inserted into housing 200. One or more sheets 336 of media may be placed in input media area 212 and fed through ADF 83 and past flatbed scan bar 93 and ADF scan bar 102, and out to output media area 215. For a one-sided or simplex scanning operation, sheets of media are fed through ADF 83 and one of flatbed scan bar 93 and ADF scan bar 102 is used to scan one surface of the media, depending on the design of ADF 83. For duplex scanning, media fed through ADF 83 from input media area 212 pass between flatbed scan bar 93 and ADF scan bar 102 where the top and bottom surfaces are scanned thereby, respectively. If flatbed scan bar 93 of flatbed scanner tray 80 is used for scanning media sheets fed through ADF 83 either in simplex mode or duplex mode, flatbed scan bar 93 is moved to a fixed position beneath imaging surface 370 generally upstream of the ADF scan bar 102 relative to the media feed direction as illustrated in FIG. 8. It is also contemplated that reverse arrangement between scan bars may be implemented where the flatbed scan bar 93 of flatbed scanner tray 80 is positioned downstream from ADF scan bar 102 of ADF tray 85. The upstream and downstream arrangement between scan bars prevents light from each of the scan bars from interfering with each other during duplex scanning.

Figure 9:
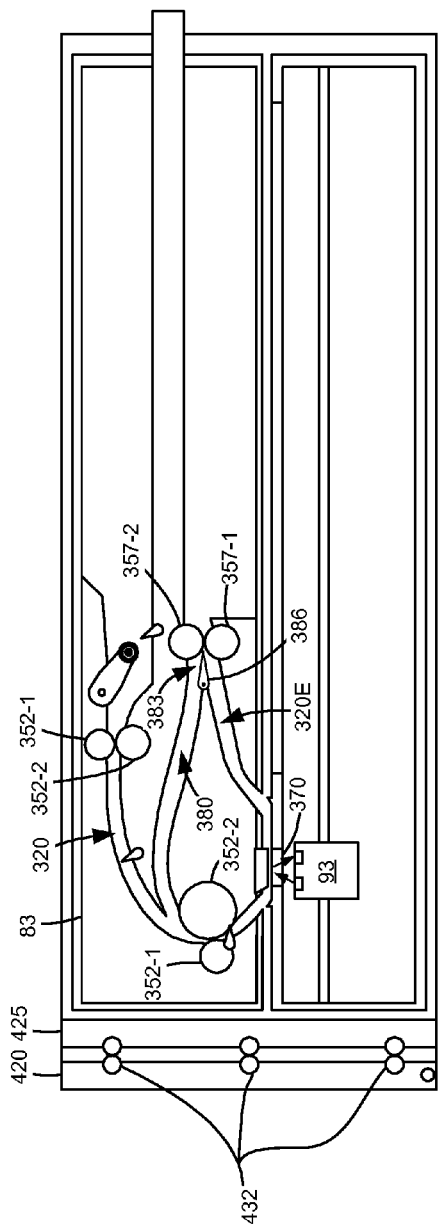
FIG. 9 is a schematic illustration of the scanner option assembly including a duplex path, according to another example embodiment.

In alternative example embodiment shown in FIG. 9, ADF 83 may include a duplex path instead of incorporating ADF scan bar 102 to provide duplex scanning functionality. A return path 380 is provided at an intersection 383 with media exit path portion 320E near exit rolls 357-1, 357-2. In this example, exit rolls 357-1, 357-2 are reversible and may be driven by a reversible motor (not shown) to move media sheet towards output media area 215, or move the media sheet in a reverse direction into return path 380. A diverter 386 is positioned at intersection 383 and is used to divert a media sheet being retracted by exit rolls 357-1, 357-2 into return path 380. Diverter 386 may be used as a sensor for sensing the leading and trailing edges of the media sheet. Alternatively, a media sensor may be positioned at intersection 383 to detect leading and trailing edges of the media sheet. In operation, a picked media sheet is conveyed by feed rolls 352-1, 352-2 along ADF path 320 to pass through flatbed scan bar 93 to scan a first side of the media sheet held against imaging surface 370. Upon the trailing edge of the media sheet being detected by diverter 386, exit rolls 357-1, 357-2 are driven in reverse and diverter 386 is oriented to divert the media sheet into return path 380. The media sheet eventually enters back to ADF path 320 and passes through the flatbed scan bar 93 with a second side of the media sheet held against imaging surface 370 and scanned by the flatbed scan bar 93.

Figure 10:
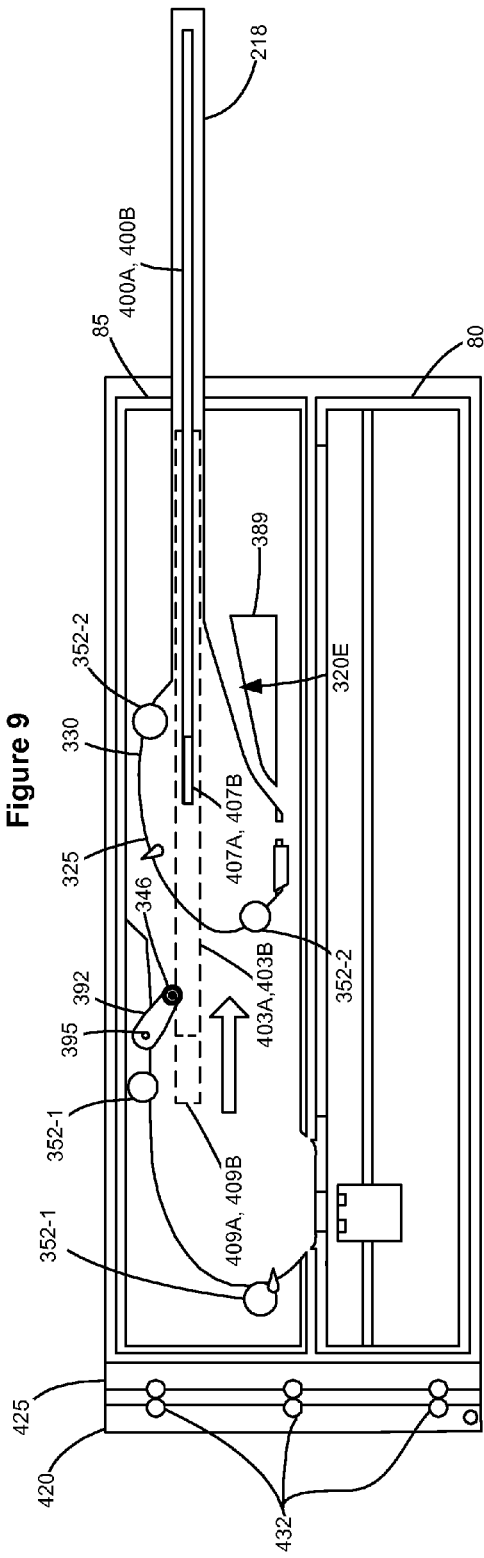
FIG. 10 is schematic illustration of the scanner option assembly with a front ADF path assembly of the ADF scanner tray detached therefrom, according to an example embodiment.

In an example embodiment, front ADF path assembly 330 may be detachably connected to ADF tray 85 in order to provide a means for clearing media jams within ADF path 320. FIG. 10 shows front ADF path assembly 330 being detached from ADF tray 85 and partially withdrawn from ADF tray 85. In FIGS. 11A-11B, top schematic views of ADF tray 85 are illustrated, with front ADF path assembly 330 attached to ADF tray 85 in FIG. 11A and removed therefrom in FIG. 11B. Although it is shown in FIG. 10 that a lower guide member 389 of media exit path portion 320E is formed as part of front ADF path assembly 330 and detached together therewith, it is understood that the lower guide member 389 may be integrated as part of the frame of ADF tray 85 and, thus, may remain attached to ADF tray 85 when front ADF path assembly 330 is detached. Pick roll 346 is movable to permit removal and insertion of front ADF path assembly 330. For example, pick roll 346 may be mounted at a free end of a pick arm 392 that is pivotable about a pivot axis defined by a shaft 395. In order not to obstruct the removal and insertion of front ADF path assembly 330, pick arm 392 may be rotated, either mechanically or electrically, to lift pick rolls 346 away from and clear of front ADF path assembly 330. Alternatively, pick arm 392 may be passive and operated by gravity to allow pick rolls 346 to engage and just move along the profile of second media guide member 325 of front ADF path assembly 330 during insertion and removal thereof.

Referring to FIGS. 10-11B a pair of guides 400A, 400B is provided on the sides 330A, 330B of front ADF path assembly 330. Guides 400A, 400B travel in corresponding channels 403A, 403B on inner side walls 85A, 85B of ADF tray 85, respectively to assist with the insertion and removal of front ADF path assembly 330. A latch mechanism may be provided to facilitate in the mating of front ADF path assembly 330 with ADF tray 85. For example, first latch members 407A, 407B may be provided on sides 330A, 330B of front ADF path assembly 330, respectively, and corresponding second latch members 409A, 409B may be provided on the inner side walls 85A, 85B of ADF tray 85, respectively. Second latch members 409A, 409B and corresponding first latch members 407A, 407B cooperatively engage when front ADF path assembly 330 is fully inserted within ADF tray 85 to secure front ADF path assembly 330 in place. Slidably removing front ADF path assembly 330 unlatches the second latch members 409A, 409B from the first latch members 407A, 407B, respectively. Additionally or in the alternative, other latch mechanisms may be utilized for latching and unlatching front ADF path assembly 330 to/from ADF tray 85. Thus, should a media jam occur within ADF tray 85, front ADF path assembly 330 may be readily slid out of ADF tray 85 to allow access to the media jam, and conversely, back into position within ADF tray 85 after clearing the media jam. The configuration also allows for easy replacement of front ADF path assembly 330.

Drive mechanism 410, operatively coupled to feed motor 99, is used to drive feed roll pairs 352 positioned along ADF path 320. In one example embodiment, driven rolls 352-1 of the feed roll pairs 352 may be integrated as part of ADF tray 85 and are operatively coupled to drive mechanism 410, while idler rolls 352-2 may be integrated as part of front ADF path assembly 330. Feed nips 354 are formed between corresponding feed roll pairs 352 when front ADF path assembly 330 is installed within ADF tray 85 (see FIG. 8). Conversely, in an alternative example embodiment, driven rolls 352-1 of the feed roll pairs 352 may be integrated as part of front ADF path assembly 330 while idler rolls 352-2 may be integrated as part of ADF tray 85 with a suitable coupling mechanism provided to drive mechanism 410 as are known in the art.

Referring again to FIGS. 7-8, the rear portion of housing 200 may include media feed through channel 115 extending between the top 230 and bottom 246 of housing 200, and defined between an inner guide 420 and an outer guide 425. Media feed through channel 115 allows a media sheet to be fed from an inferior option device to one of a superior option device and IFD 33. Ends of media feed through channel 115 form a media entry slot 427 and a media exit slot 429 formed at the bottom 246 and top 230 of housing 200, respectively. FIG. 7, for example, illustrates media exit slot 429 formed on the top 230 of housing 200 extending between side walls 233A, 233B. Media entry slot 427 is arranged to receive media sheets from an inferior option device, and the received media sheets exit scanner option assembly 37-2 through media exit slot 429. Media exit slot 429 aligns with media path extension PX of a superior option device 50 or IFD 33 which receives the media sheets fed from scanner option assembly 37-2. One or more feed roll pairs 432 each having a driven roll 432-1 and an idler roll 432-2 are positioned along media feed through channel 115 to translate media therethrough. In one example, each driven feed roll 432-1 is operatively coupled to drive mechanism 410.

Defining a rear surface along the rear portion of housing 200 is a jam door 450 which generally provides access to media feed through channel 115 for clearing media jams therein, according to an example embodiment. In the example shown, outer guide 420 forms part of jam door 450. Jam door 450 is pivotally connected at a pivot 453 to housing 200, and rotatable between a closed position, in which jam door 450 covers inner guide 425, and an open position in which jam door 450 uncovers inner guide 425 and exposes it. Although jam door 450 is shown pivotally connected to housing 200, it should be apparent that jam door 450 may be connected to housing 200 using a detachable connection. Jam door 450 may be snap fit into place or include a release mechanism 452 attached thereto which engages a portion of housing 200 to releasably close or open jam door 450. It is contemplated that any form of latch/release mechanisms may be utilized in order to retain jam door 450 in the closed position or release jam door 450 to the open position.

Various electrical contacts may be disposed within scanner option assembly 37-2 for passing electrical power from housing 200 to various components within flatbed scanner tray 80 and ADF tray 85, and establishing communication links for placing flatbed scanner tray 80 and ADF tray 85 in operable communication with controller 90. With reference to FIGS. 12A-12B, top schematic views of flatbed scanner tray 80 are shown. In FIG. 12A, flatbed scanner tray 80 is inserted within housing 200 while, in FIG. 12B, flatbed scanner tray 80 is extended out of housing 200 to expose scan window 203. As illustrated, housing 200 includes electrical contact 271A positioned to contact with an electrical connector 460 disposed on a side of base 300 when flatbed scanner tray 80 is inserted within housing 200. Additionally, in order to accommodate scanning while flatbed scanner tray 80 is extended out of housing 200, housing 200 may include an electrical contact 463 disposed to contact with electrical connector 460 on the side of base 300. Thus, electrical contacts 271A, 463 provide electrical power from housing 200 to flatbed scanner tray 80 to accommodate scan modes where flatbed scanner tray 80 is inserted within or extended out of housing 200. Electrical contacts 271A, 463 may also be used to establish communication links between controller 90 and various components within flatbed scanner tray 80. In an alternative example embodiment, electrical connection between housing 200 and flatbed scanner tray 80 may be establish using a cable 466 which is shown in dotted lines in FIG. 12B. The span or length of cable 466 may be selected to allow cable 466 to accommodate the full range of travel of flatbed scanner tray 80 as it is extended out of housing 200 and to permit its removal if needed.

Referring back to FIGS. 11A-11B, housing 200 may also include electrical contact 271B that is positioned to contact with an electrical connector 470 disposed on the outer surface of side wall 85A of ADF tray 85 when ADF tray 85 is inserted within housing 200. Electrical contact 271B provides electrical power from housing 200 to ADF tray 85 to accommodate ADF scan mode operations, and may also be used to establish communication links between controller 90 and various components within ADF tray 85. In the example embodiment where front ADF path assembly 330 is detachable from ADF tray 85, the inner surface of side wall 85A of ADF tray 85 may additionally be provided with an electrical contact 473 to contact an electrical connector 476 disposed on side 330A of front ADF path assembly 330 to pass power and/or establish communication links between controller 90 and various components of front ADF path assembly 330 when it is attached to ADF tray 85.

With the above example embodiments, a scanner system can be moved into an option assembly beneath any printing device which allows for the printing device to be turned into an AIO device, and which avoids having to include a scanner superstructure conventionally needed for AIO devices. Removing the scanner superstructure reduces the overall height of the AIO device and by moving the flatbed scanner and ADF scanner to a lower position, users may have easier access to scanning functionalities without having to strain to get to the highest point of the AIO device. Alternatively, users may have the option to adjust scanner height by placing the scanner option assembly to a desired position relative to other option assemblies in the option stack. The configuration also removes the cave structure around the exit bin providing users with enough room to retrieve printed documents. Additionally, removing the scanner superstructure eliminates the need to have a clear space above the AIO device needed for opening and closing a scan window cover, which thereby allows for the AIO device to be placed in compact spaces such as within cabinets or under a desk. Furthermore, the above example embodiments allows for scanner modularity and, thus, easy replacement, and having the flatbed and ADF scanners as modular trays that can be enclosed within the housing of the scanner option assembly may reduce accumulation of dirt, dust, or other contaminants on the flatbed and ADF scanners.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A scanner option assembly for an image forming device, the scanner option assembly comprising:
    a housing removably attachable to a bottom of a housing of the image forming device; and,
    a scanner assembly mounted in the housing and being positionable to receive an original for scanning,
    wherein, when the housing of the scanner option assembly is attached to the bottom of the housing of the image forming device, the scanner assembly receives power from the image forming device with the scanner assembly being in operable communication with a controller in the image forming device and a user interface mounted on the housing of the image forming device for receiving instructions from one of the controller and the user interface of the image forming device and providing scan data of an image of the original to the controller, and,
    further wherein, the scanner option assembly is configured to pass power from the image forming device and operable communications from the controller to an inferior option device when the inferior option device is attached to the housing of the scanner option assembly.

2. The scanner option assembly of claim 1, wherein the scanner assembly includes a flatbed scanner slidably extendible and retractable through an opening in the housing.

3. The scanner option assembly of claim 2, wherein the flatbed scanner includes a hinged lid movable between a closed position and an open position relative to an imaging surface of the flatbed scanner when the flatbed scanner is extended out of the opening in the housing.

4. The scanner option assembly of claim 2, wherein the flatbed scanner includes a first image capture unit for capturing an image of a first surface of the original.

5. A scanner option assembly for an image forming device, the scanner option assembly comprising:
- a housing removably attachable to a bottom of a housing of the image forming device;
- a scanner assembly mounted in the housing and being positionable to receive an original for scanning; and,
- a media feed through channel extending between a top and a bottom of the housing of the scanner option assembly, the media feed through channel for allowing a media sheet to be fed from an inferior option device attached to the bottom of the housing of the scanner option assembly to one of a superior option device and the image forming device attached to the top of the housing of the scanner option assembly,
- wherein, when the housing of the scanner option assembly is attached to the bottom of the housing of the image forming device, the scanner assembly receives power from the image forming device with the scanner assembly being in operable communication with a controller in the image forming device and a user interface mounted on the housing of the image forming device for receiving instructions from one of the controller and the user interface of the image forming device and providing scan data of an image of the original to the controller.

6. The scanner option assembly of claim 1, further comprising a scanner assembly controller for controlling operation of the scanner assembly, the scanner assembly controller being in operable communication with the controller of the image forming device when the housing of the scanner option assembly is attached to the bottom of the housing of the image forming device.

7. A scan module, comprising:
- a housing having an opening; and,
- a scanner assembly for capturing an image of an original and mounted within the housing, at least a portion of the scanner assembly being slidably extendible through the opening, the scanner assembly configured to be in operable communication with a controller of an imaging device and with a user interface mounted on a housing of the imaging device for receiving instructions therefrom and providing scan data of the captured image to the controller, the scanner assembly including at least one of a flatbed scanner and an automatic document feeder (ADF) assembly;
- wherein, the housing of the scan module is removably attachable to one of a bottom of the housing of the image forming device and a bottom of a housing of an option device attached to the bottom of the housing of the image forming device, and,
- further wherein, the flatbed scanner and the ADF assembly are each independently slidably insertable through the opening.

8. The scan module of claim 7, wherein the ADF assembly includes a media guide member that is detachably connected to the ADF assembly.

9. An option assembly for an image forming device, the option assembly comprising:
- a housing removably attachable to one of a bottom of a housing of the image forming device and a bottom of a housing of a superior option device attached to the bottom of the housing of the image forming device, the housing of the option assembly having an opening therein; and,
- a scanner assembly slidably mounted in the housing of the option assembly and movable between a first position within the housing of the option assembly and a second position extending out through the opening of the housing of the option assembly;
- wherein, when the housing of the option assembly is attached to one of the bottom of the housing of the image forming device and the bottom of the housing of the superior option device, the scanner assembly is in operable communication with a controller in the image forming device and a user interface mounted on the housing of the image forming device for receiving instructions from one of the controller and the user interface and capturing an image of at least one surface of an original when the scanner assembly is in the second position and providing the captured image to the controller, and,
- further wherein, the scanner assembly is configured to pass power from the image forming device and operable communications from the controller to an inferior option device when the inferior option device is attached to the housing of the option assembly.

10. The option assembly of claim 9, wherein the scanner assembly comprises a flatbed scanner having a first image capture unit for capturing an image of a surface of the original when the flatbed scanner is in the second position.

11. The option assembly of claim 10, further comprising a hinged lid for covering an imaging surface of the flatbed scanner, the hinged lid being movable between a closed position and an open position relative to the imaging surface when the flatbed scanner is in the second position.

12. An option assembly for an image forming device, the option assembly comprising:
- a housing removably attachable to one of a bottom of a housing of the image forming device and a bottom of a housing of a superior option device attached to the bottom of the housing of the image forming device, the housing of the option assembly having an opening therein; and,
- a scanner assembly mounted in the housing of the option assembly, the scanner assembly positioned to receive an original inserted through the opening of the housing of the option assembly;
- wherein, when the housing of the option assembly is attached to one of the bottom of the housing of the image forming device and the bottom of the housing of the superior option device, the scanner assembly is in operable communication with a controller in the image forming device and a user interface mounted on the housing of the image forming device for receiving instructions from one of the controller and the user interface of the image forming device and for capturing an image of at least one surface of the original received through the opening of the option assembly housing and providing the captured image to the controller, and,
- further wherein, the scanner assembly is configured to pass power from the image forming device and operable communications from the controller to an inferior option device when the inferior option device is attached to the housing of the option assembly.

13. The option assembly of claim 12, wherein the scanner assembly includes an automatic document feeder (ADF) assembly for automatically feeding one or more media sheets into an image capture area of the scanner assembly.

14. The option assembly of claim 13, wherein the ADF assembly includes a media guide member that is detachably connected to the ADF assembly.

15. An option assembly for an image forming device, the option assembly comprising:
- a housing removably attachable to a bottom of the image forming device; and
- a scanner assembly mounted within the housing, the scanner assembly including:
  - an imaging surface for receiving an original to be scanned;
  - an image capture unit for capturing an image of a surface of the original, the image capture unit in operable communication with a controller in the image forming device and a user interface mounted on a housing of the image forming device for receiving instructions therefrom and providing image data to the controller for processing when the housing of the option assembly is attached to the bottom of the housing of the image forming device; and,
  - a power buss for passing power from the image forming device and a communication link for placing the controller in operable communication with an inferior option device when a housing of the inferior option device is attached to the bottom of the housing of the option assembly.

16. An imaging system, comprising:
- an image forming device for printing images on a sheet of medium, the image forming device having a controller therein and a user interface mounted on a housing thereof, the user interface being in operable communication with the controller; and,
- an image capture device removably attachable to one of a bottom of the housing of the image forming device and a bottom of a housing of a superior option device attached to the bottom of the housing of the image forming device, the image capture device in operable communication with the controller and the user interface for receiving instructions from one of the controller and the user interface, the image capture device capturing an image of an original and providing image data of the original to the controller of the image forming device for printing on the sheet of medium, the image capture device including a housing removably attachable to one of the bottom of the housing of the image forming device and the bottom of the housing of the superior option device attached to the bottom of the housing of the image forming device, the housing of the image capture device having slidably mounted therein at least one of a flatbed scanner and an automatic document feeder assembly that is slidably extendible through an opening in the housing of the image capture device,
- wherein, the flatbed scanner and the automatic document feeder are each independently slidably insertable through the opening.

17. A scanner option assembly for an image forming device, the scanner option assembly comprising:
- a housing removably attachable to a bottom of a housing of the image forming device; and,
- a scanner assembly mounted in the housing and being positionable to receive an original for scanning;
- wherein, when the housing of the scanner option assembly is attached to the bottom of the housing of the image forming device, the scanner assembly receives power from the image forming device with the scanner assembly being in operable communication with a controller in the image forming device and a user interface mounted on the housing of the image forming device for receiving instructions from one of the controller and the user interface of the image forming device and providing scan data of an image of the original to the controller,
- wherein, the scanner assembly includes a flatbed scanner slidably extendible and retractable through an opening in the housing,
- wherein, the flatbed scanner includes a first image capture unit for capturing an image of a first surface of the original, and,
- wherein, the scanner assembly includes an automatic document feeder (ADF) assembly having a second image capture unit for capturing an image of a second surface of the original.

18. The scanner option assembly of claim 17, wherein the flatbed scanner includes a hinged lid movable between a closed position and an open position relative to an imaging surface of the flatbed scanner when the flatbed scanner is extended out of the opening in the housing.

19. The scanner option assembly of claim 17, further comprising a media feed through channel extending between a top and a bottom of the housing thereof, the media feed through channel for allowing a media sheet to be fed from an inferior option device attached to the bottom of the housing of the scanner option assembly to one of a superior option device and the image forming device attached to the top of the housing of the scanner option assembly.

20. The option assembly of claim 19, further comprising a jam door connected to the housing adjacent the media feed through channel, wherein the jam door is movable between an open position and a closed position relative to the media feed through channel and, when in the open position, the media feed through channel is accessible.

21. The scanner option assembly of claim 17, further comprising a scanner assembly controller for controlling operation of the scanner assembly, the scanner assembly controller being in operable communication with the controller of the image forming device when the housing of the scanner option assembly is attached to the bottom of the housing of the image forming device.

22. The scanner option assembly of claim 17, wherein the scanner option assembly is configured to pass power from the image forming device and operable communications from the controller to an inferior option device when the inferior option device is attached to the housing of the scanner option assembly.

23. The scanner option assembly of claim 17, further comprising a power buss for passing power from the image forming device and a communication link for placing the controller in operable communication with an inferior option device when the inferior option device is attached to the bottom of the housing of the scanner option assembly.

24. A scan module, comprising:
- a housing having an opening; and,
- a scanner assembly for capturing an image of an original and mounted within the housing, at least a portion of the scanner assembly being slidably extendible through the opening, the scanner assembly configured to be in operable communication with a controller of an imaging device and with a user interface mounted on a housing of the imaging device for receiving instructions therefrom and providing scan data of the captured image to the controller;
- wherein, the housing of the scan module is removably attachable to one of a bottom of the housing of the image forming device and a bottom of a housing of an option device attached to the bottom of the housing of the image forming device, wherein, the scanner assembly includes at least one of a flatbed scanner and an automatic document feeder (ADF) assembly, and, wherein, the flatbed scanner includes a first image capture unit for capturing an image of a first side of the original, and the ADF assembly includes a second image capture unit for capturing an image of a second side of the original.

25. The scan module of claim 24, wherein the ADF assembly includes a media guide member that is detachably connected to the ADF assembly.

26. The scan module of claim 24, wherein the flatbed scanner and the ADF assembly are each independently slidably insertable through the opening.

27. A scan module, comprising:
a housing having an opening; and,
a scanner assembly for capturing an image of an original and mounted within the housing, at least a portion of the scanner assembly being slidably extendible through the opening, the scanner assembly configured to be in operable communication with a controller of an imaging device and with a user interface mounted on a housing of the imaging device for receiving instructions therefrom and providing scan data of the captured image to the controller;
wherein, the housing of the scan module is removably attachable to one of a bottom of the housing of the image forming device and a bottom of a housing of an option device attached to the bottom of the housing of the image forming device,
wherein, the scanner assembly includes at least one of a flatbed scanner and an automatic document feeder (ADF) assembly, and,
wherein, the flatbed scanner includes an image capture unit for capturing an image of at least one surface of the original, and the ADF assembly includes a duplex media path portion to allow duplex scanning of the original using the image capture unit.

28. The scan module of claim 27, wherein the ADF assembly includes a media guide member that is detachably connected to the ADF assembly.

29. The scan module of claim 27, wherein the flatbed scanner and the ADF assembly are each independently slidably insertable through the opening.

30. The option assembly of claim 5, further comprising a jam door connected to the housing adjacent the media feed through channel, wherein the jam door is movable between an open position and a closed position relative to the media feed through channel and, when in the open position, the media feed through channel is accessible.

31. A scanner option assembly for an image forming device, the scanner option assembly comprising:
a housing removably attachable to a bottom of a housing of the image forming device;
a scanner assembly mounted in the housing and being positionable to receive an original for scanning; and,
a power buss for passing power from the image forming device and a communication link for placing the controller in operable communication with an inferior option device when the inferior option device is attached to the bottom of the housing of the scanner option assembly,
wherein, when the housing of the scanner option assembly is attached to the bottom of the housing of the image forming device, the scanner assembly receives power from the image forming device with the scanner assembly being in operable communication with a controller in the image forming device and a user interface mounted on the housing of the image forming device for receiving instructions from one of the controller and the user interface of the image forming device and providing scan data of an image of the original to the controller.

* * * * *